Figure 1:
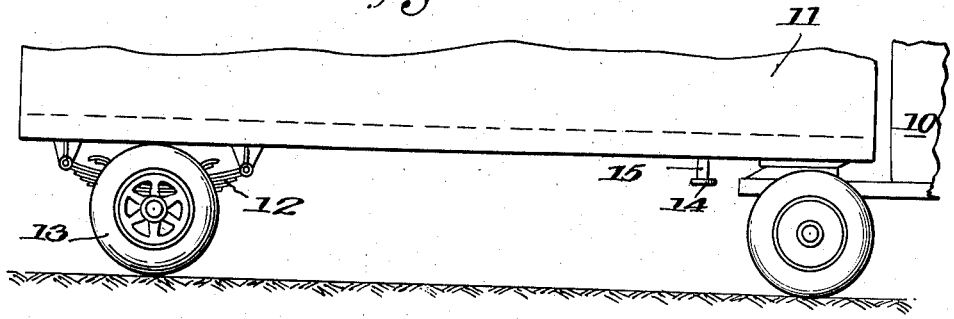

April 30, 1940.　　　J. L. BROWN　　　2,198,758
TRUCK SUPPORT
Filed Dec. 29, 1939　　　3 Sheets-Sheet 1

Inventor
Joseph L. Brown,
By Karl Fenning
his Attorney

April 30, 1940.  J. L. BROWN  2,198,758
TRUCK SUPPORT
Filed Dec. 29, 1939  3 Sheets-Sheet 2
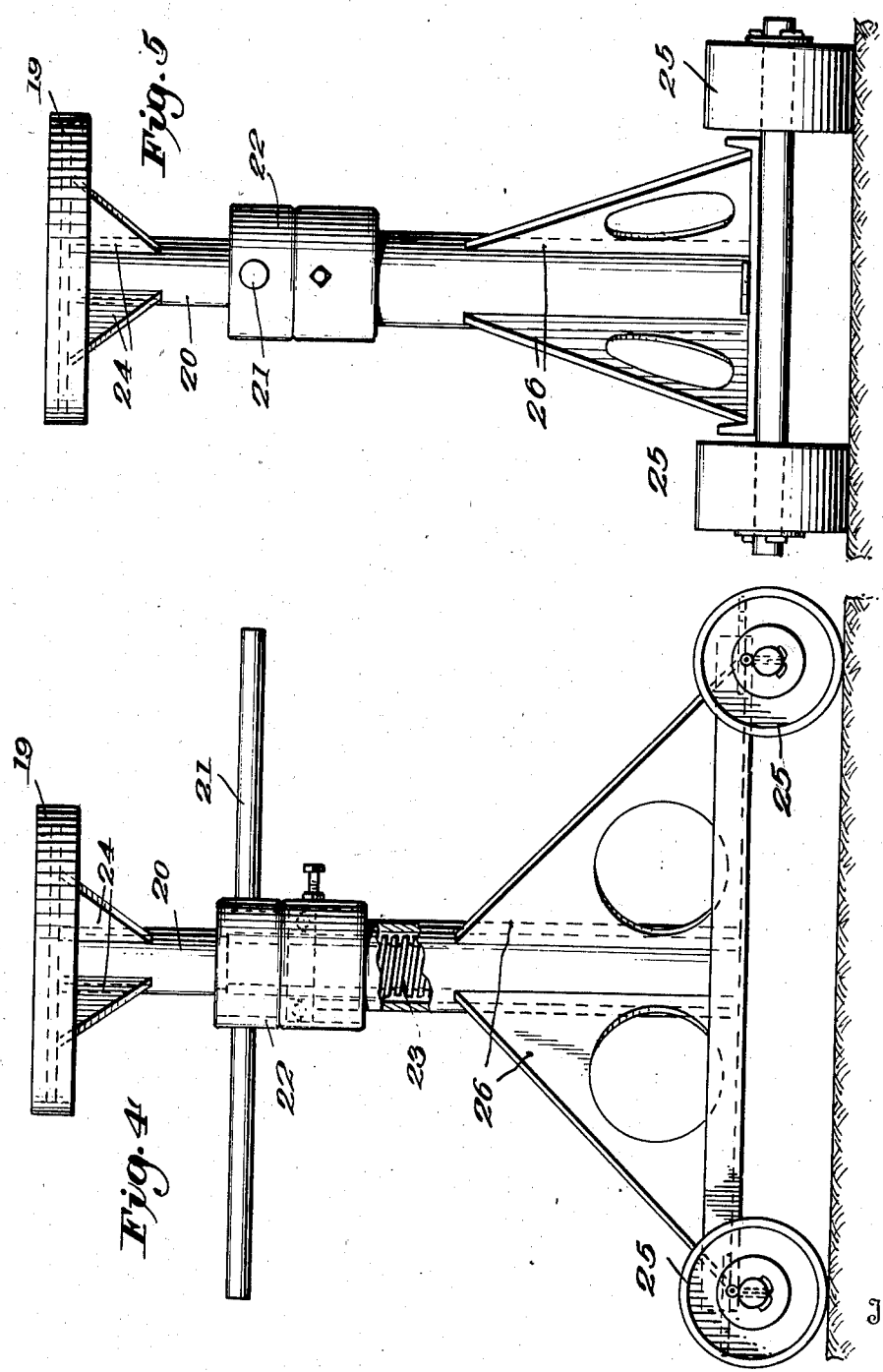
Inventor
Joseph L. Brown,
By Karl Fenning
his Attorney April 30, 1940.                J. L. BROWN                2,198,758
                              TRUCK SUPPORT
                          Filed Dec. 29, 1939            3 Sheets-Sheet 3
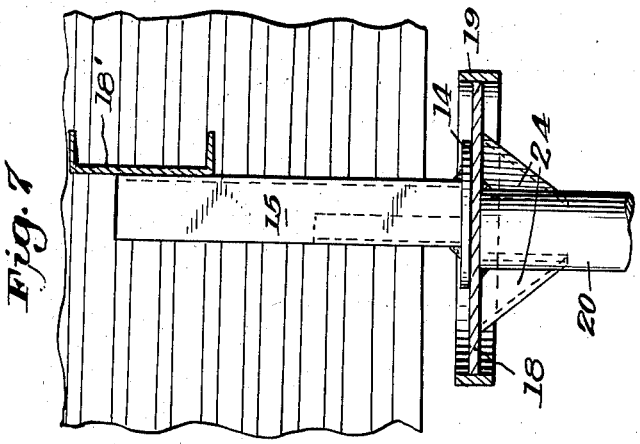
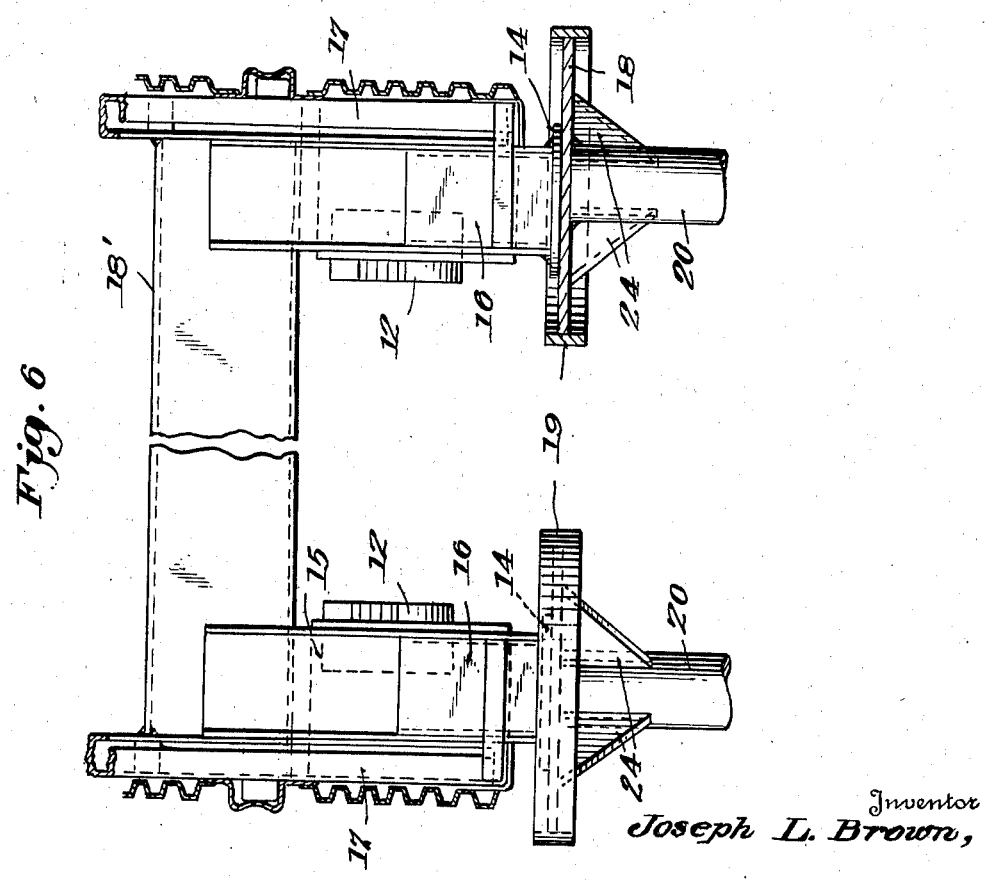
Inventor
Joseph L. Brown,
By Carl Fenning
His Attorney Patented Apr. 30, 1940

2,198,758

UNITED STATES PATENT OFFICE 2,198,758

TRUCK SUPPORT

Joseph L. Brown, Charlotte, N. C., assignor to Brown Equipment & Manufacturing Company, Charlotte, N. C., a corporation of North Carolina Application December 29, 1939, Serial No. 311,670

16 Claims. (Cl. 254—134)

Much freight is transported along the highways in trucks. Many of these are trailer trucks which are drawn by tractors. Ordinarily the trailer truck includes a rear axle having wheels at its ends and supporting the truck by means of springs. These wheels are ordinarily separated about as wide as the width of the truck. At the front end means are provided for attaching the truck to the tractor which itself is provided with supporting wheels. In this condition the trucks pass over the highway. While loading, unloading and at other times when not attached to the tractor means must be provided for supporting the front end of the truck. This means usually consists of a pair of small wheels having a tread very much narrower than the truck itself and mounted near the forward end of the truck on a frame of some sort. These wheels may be forced downward to support the forward end of the truck at about the same height as the rearward end of the truck or higher. After the tractor has been attached, ordinarily these narrow tread supporting wheels are drawn upward and out of contact with the road. This mechanism sometimes gets out of order and because of this may tie up the entire truck from service. The retractable wheels and associated mechanism are heavy, weighing generally several hundred pounds, and because of their presence when the truck is going over the highway reduce by this extent the pay load the truck may carry. Since these auxiliary supporting wheels have a narrow tread and are attached toward the center of the trailer they do not afford as stable a support as is sometimes needed. Ordinarily the trailers are provided with means for engaging the tractors while in transit. It is not generally possible to ascertain just how the tractor will approach the trailer and in order to procure proper coupling connection some means is generally provided for adjustment in their relative positions. Thus in order to make the proper connection it may be necessary to move the trailer slightly sideways, or longitudinally or both to bring it in position for final attachment to the tractor. This sideways movement of the trailer may cause the narrow gauge front wheels of the trailer to collapse or, since they are attached in a fixed position and have no side movement may even cause the trailer to turn or upset.

It is a purpose of the present invention to avoid the difficulties, inconveniences and inefficiencies indicated above while at the same time retaining the benefits and advantages of the trailer and tractor truck transportation. There is, of course, a considerable advantage in having a detachable trailer which need not tie up the use of the tractor engine during periods when the trailer is being loaded and unloaded. Likewise there may be a considerable advantage in not tying up the load-carrying trailer when repairs or changes are necessary in the motor carrying tractor.

The present invention contemplates omission of the narrow gauge front supporting wheels for the trailer. There are provided specially designed means for receiving a specially designed jack for lifting and supporting the front of the trailer near or at each side. The jacks need be used only when the tractor is not present. They are not attached to the trailer and consequently their weight does not reduce the pay load of the trailer. Since they are separate and detached they may ordinarily be kept at the terminals, warehouses or garages where the trailers and tractors are assembled and the jacks may thus be employed for any suitable trailer which may happen at the time to be needing them.

Figure 2:
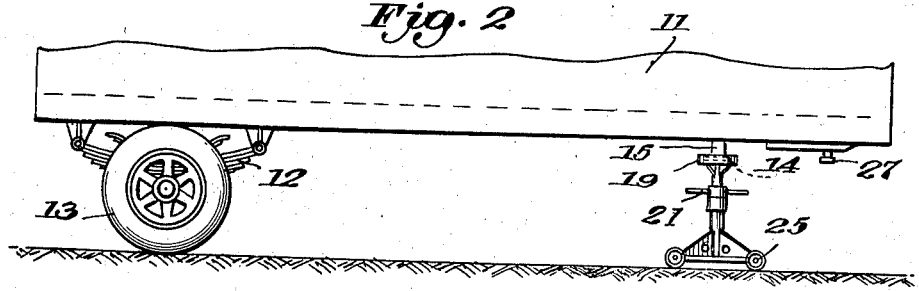
Figure 3:
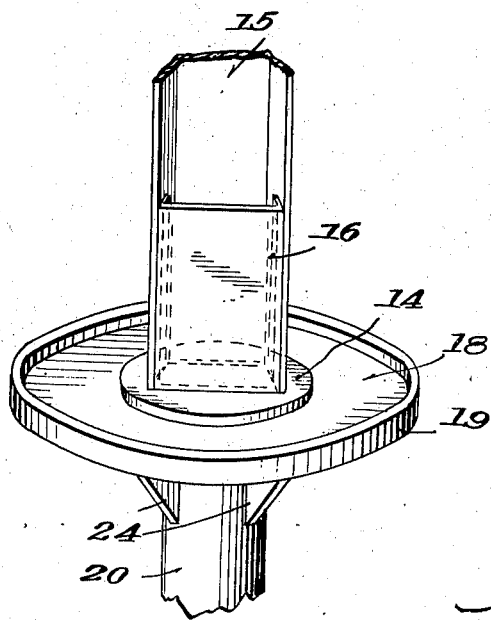
Figure 8:
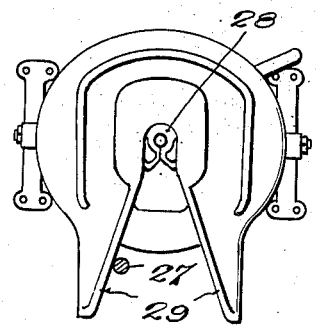

A specific, preferred form of embodiment of the invention is illustrated in the accompanying drawings in which Figure 1 is a fragmentary side elevation of a trailer attached to a tractor. Fig. 2 is a similar fragmentary side elevation of a trailer detached from the tractor and supported by jacks. Fig. 3 is a fragmentary perspective view of the head of a jack associated with a jack receiving support on the trailer body. Fig. 4 is a side elevation, partly broken away, of a jack. Fig. 5 is a front elevation of a jack. Fig. 6 is a fragmentary transverse section of a trailer body and a portion of the supporting jacks. Fig. 7 is a fragmentary diagrammatic longitudinal section of a portion of the trailer shown in Fig. 6. Fig. 8 is a fragmentary diagrammatic plan of part of a trailer connection.

The tractor 10, for highway use, is attached to the trailer 11 in any suitable, well known manner. As illustrated in Fig. 1 the trailer is thus supported at its forward end by the tractor and at its rearward end is mounted through springs 12 on the rear wheels 13 in a manner well known in the art. Depending from the body of the trailer near its forward end are jack receiving members consisting of a head 14 at the lower end of a shaft 15. The shaft 15 preferably will be a channel iron as indicated in Fig. 3 and it may be reinforced by a reversely arranged channel iron 16, the seat member 14 being attached at the bottom of the combined members 15 and 16. The members 15 are preferably arranged at opposite sides of the truck near its forward end and lie closely in contact with the side members 17 of the truck to which they may be fastened and braced by any suitable means. The upper ends of the shafts 15 preferably are rigidly attached in any suitable manner to one of the forward transverse floor supporting members 18'. Thus the jack receiving shafts 15 may be rigidly braced in both directions and may be appropriately attached and associated with the body and floor of the trailer so as to give the most efficient and effective distribution of load. The bottom plate 14 on the shaft 15 is preferably circular in cross section. It is flat and provided with a flat smooth lower surface.

For lifting the trailer and supporting it when apart from the tractor 10 the jack receiving members 14 may be engaged by the heads 18 of jacks such as indicated in Figs. 4 and 5. The head member 18 of the jack is preferably flat and has a smooth upper surface on which the plate 14 may rest and on which it may have a slight movement in any direction. The head 18 is considerably larger in area than the plate 14, being illustrated as about twice as large. This aids in the engagement of the members, makes it possible for the jack to be placed easily and to operate satisfactorily to support and lift the trailer even if the plates 14 may not be centrally located on the heads 18. Thus at the right in Figs. 6 and 7 the plates 14 are indicated somewhat eccentric of the plates 18. The plates 18 are surrounded by upstanding, circumferential collar members 19 which limit the movement of the members 14 and prevent them from sliding entirely off the plates 18 and out of contact with the jacks. The head members 18 are on the upper ends of shafts 20 which may be moved vertically in the jacks in any suitable way, such as by means of the hand rods 21, turning the nut 22 on the worm shaft 23. The head 18 of the jack is considerably larger in cross section than the lifting shaft 20 and it may be braced and supported thereon in any suitable way such as by the flat, triangular gussets 24 illustrated. Any suitable number of such bracing members may be employed. The jacks preferably are supported on wheels 25, four of these being illustrated, and a suitable number of triangular gussets 26 substantially brace the central column of the jack to the wheels and their frame.

When it is desired to dissociate a tractor from a trailer two jacks may be pushed on their wheels into position approximately under the jack shafts 15 at the sides of the trailer. Because of the large area of the jack head 18 it is not necessary to take meticulous care to have the supporting columns 15 directly centered over the jack shafts 20. So long as the plates 14 are within the collars 19 of the jacks the lifting may take place. Because of the contact of the smooth surfaces of 14 and 18 slight movement or adjustment may take place as may be caused by the distribution of the load in the trailer.

The unattached trailer may stand supported by the jacks in place under the jack receiving members.

The means for attaching the trailer and tractor together may be of any suitable kind. For instance the trailer may be provided with a centrally located depending king-pin 27. Placed on the tractor may be a clamping device 28 for gripping and holding the king-pin in a manner well known. Leading to the gripping device 28 is a channel having inclined side walls 29. Normally the walls 29 will extend backwardly so that as the tractor is backed under the trailer for coupling the king-pin only has to hit within the limits of the V in order to be properly engaged when the tractor is forced further in the direction of the trailer. The king-pin being attached to the trailer, when it comes in contact with one of the sides 29 of the channel tends to force the front end of the trailer to shift as the pin comes nearer and nearer the center or base of the V, at which point an automatic locking device may engage the pin and hold it when the tractor goes either forward or backward. As the tractor approaches the trailer it cannot be determined definitely where the pin will hit. If it hits toward the left as illustrated in Fig. 8 it will tend to force the front end of the trailer to the right as the tractor moves further in. Of course if the pin happens to hit on the right hand wall 29 it will force the trailer toward the left. Instead of upsetting the trailer this side movement may be taken care of by a shifting movement between the plates 14 and 18, which shifting may take place automatically in accordance with the pressure. It is clear that the plate 14 may move on the plate 18 at least until it comes in contact with the surrounding collar 19 and this movement is ordinarily enough to provide the shifting movement necessary.

There is also a possibility of the trailer being pushed backward unless it happens to be backed fast to a platform at the time the tractor is affixed. As shown in Fig. 2 the jacks will preferably be put in position under the trailer so that the wheels supporting the jack will be more or less in line with the rear wheels 13 and so that they may move fore and aft with the trailer. Thus when the tractor is backed into position to engage the king-pin it may move the plate 14 on the jack head 18 sideways, forward or backward until the plate engages the collar 19 and then further rearward movement of the tractor may cause the jacks to move backward with the rear wheels 13 of the trailer. This gives sufficient safe movement to insure the king-pin on the trailer coming surely and safely into its proper place in the tractor without interfering with the balance of the trailer or its load.

The specific mechanisms illustrated are not essential to the invention which may be embodied in other forms of apparatus.

I claim as my invention:

1. A trailer, and separable supporting means near each side near the front of the trailer self adjusting during engagement with a tractor.

2. A trailer, separable supporting means near each side near the front of the trailer, and means carried by the trailer and the supporting means allowing automatic adjustment of their engagement.

3. A trailer, supporting seats on the trailer at the sides toward the front, and separable supporting means for each supporting seat.

4. A trailer, flat smooth seats on the trailer at the sides toward the front, and separable supporting means for each supporting seat, each supporting means comprising a flat smooth head for engaging a seat and automatically adjustable thereon.

5. A trailer, flat smooth seats on the trailer at the sides toward the front, and separable supporting means for each supporting seat, each suporting means comprising a flat smooth head for engaging a seat and automatically adjustable thereon and considerably larger than the seat.

6. A trailer, downwardly projecting supporting shafts near the outward edge on each side near the front of the trailer, substantially smooth flat circular bearing members at the bottoms of the shafts, wheel supported jacks for each supporting shaft each jack having a substantially smooth flat circular bearing member for engaging the first mentioned bearing members and substantially larger in area than the first mentioned bearing members, and an upstanding retaining collar about each bearing member on the jacks.

7. A trailer, a tractor, means on the tractor for engaging the trailer, and means supporting the trailer free to shift for adjustment when the tractor is engaging.

8. A trailer, a tractor, means on the trailer to engage the tractor, means on the tractor to engage the trailer, means to align and adjust the engaging means, and means to support the trailer self-adjusting while the engaging means are brought together.

9. A trailer, a tractor, substantially centrally disposed means on the trailer to engage the tractor, substantially centrally disposed means on the tractor to engage the trailer, means to bring the engaging means into alignment, and means to support the trailer and allow it to be safely adjusted sidewise on the supporting means.

10. A trailer, a tractor, substantially centrally disposed means on the trailer to engage the tractor, substantially centrally disposed means on the tractor to engage the trailer, downwardly projecting supporting shafts near the outward edge on each side near the front of the trailer, substantially smooth flat bearing members at the bottoms of the shafts, and jacks for each supporting shaft each jack having a substantially smooth flat bearing member for engaging the first mentioned bearing members and substantially larger in area than the first mentioned bearing members.

11. In a lifting jack, an upright shaft, means for moving the shaft in a vertical direction, a substantially smooth flat circular engaging head rigid with the shaft having an area considerably larger than the cross section of the shaft, means to support the overhanging portion of the head, and an upstanding retaining collar about the circumference of the head.

12. In a lifting jack, an upright shaft, means for moving the shaft in a vertical direction, a substantially smooth flat engaging head rigid with the shaft having an area considerably larger than the cross section of the shaft and an upstanding retaining collar about the circumference of the head.

13. In a lifting jack, an upright shaft, means for moving the shaft in a vertical direction, a substantially smooth flat engaging head rigid with the shaft having an area considerably larger than the cross section of the shaft, and means to support the overhanging portion of the head.

14. In a lifting jack, wheels supporting the jack, an upright shaft, means for moving the shaft in a vertical direction, a substantially smooth flat engaging head rigid with the shaft having an area considerably larger than the cross section of the shaft, means to support the overhanging portion of the head, and an upstanding retaining collar about the circumference of the head.

15. In a lifting jack, wheels supporting the jack, an upright shaft, means for moving the shaft in a vertical direction, a substantially smooth flat engaging head rigid with the shaft having an area considerably larger than the cross section of the shaft, means to support the overhanging portion of the head and means about the circumference of the head for retaining a member when in contact with the head.

16. A trailer, a tractor, substantially centrally disposed means on the trailer to engage the tractor, substantially centrally disposed means on the tractor to engage the trailer, flat smooth seats on the trailer at the sides toward the front, and separable supporting means for each supporting seat each supporting means comprising a flat smooth head for engaging a seat and automatically adjustable thereon.

JOSEPH L. BROWN.